US010730963B2

(12) United States Patent
Zorn et al.

(10) Patent No.: US 10,730,963 B2
(45) Date of Patent: Aug. 4, 2020

(54) AQUEOUS DISPERSION OF AN OXAZOLINE GROUP-CONTAINING POLYMER

(71) Applicant: BASF SE, Ludwigshafen (DE)

(72) Inventors: Matthias Zorn, Heppenheim (DE); Kathrin Michl, Ludwigshafen (DE); Christian Brand, Hettenleidelheim (DE)

(73) Assignee: BASF SE (DE)

( * ) Notice: Subject to any disclaimer, the term of this patent is extended or adjusted under 35 U.S.C. 154(b) by 311 days.

(21) Appl. No.: 15/746,920

(22) PCT Filed: Jul. 26, 2016

(86) PCT No.: PCT/EP2016/067767
§ 371 (c)(1),
(2) Date: Jan. 23, 2018

(87) PCT Pub. No.: WO2017/017090
PCT Pub. Date: Feb. 2, 2017

(65) Prior Publication Data
US 2020/0123280 A1 Apr. 23, 2020

(30) Foreign Application Priority Data
Jul. 29, 2015 (EP) .................................... 15178810

(51) Int. Cl.
*C08F 2/22* (2006.01)
*C08F 224/00* (2006.01)
*C08F 226/06* (2006.01)
*C08F 220/18* (2006.01)
*C08F 257/02* (2006.01)
*C08F 212/08* (2006.01)
*C08F 220/56* (2006.01)

(52) U.S. Cl.
CPC .............. *C08F 2/22* (2013.01); *C08F 212/08* (2013.01); *C08F 220/18* (2013.01); *C08F 220/56* (2013.01); *C08F 224/00* (2013.01); *C08F 226/06* (2013.01); *C08F 257/02* (2013.01)

(58) Field of Classification Search
CPC ........ C08F 2/22; C08F 212/08; C08F 220/18; C08F 220/56; C08F 224/00; C08F 226/06; C08F 257/02
USPC ........................................................ 524/446
See application file for complete search history.

(56) References Cited

U.S. PATENT DOCUMENTS

| 2,520,959 | A | 9/1950 | Powers |
| 3,397,165 | A | 8/1968 | Goodma et al. |
| 4,269,749 | A | 5/1981 | Marriott et al. |
| 4,474,923 | A | 10/1984 | Keskey et al. |
| 5,512,645 | A | 4/1996 | Sawayama et al. |

FOREIGN PATENT DOCUMENTS

| CN | 1970614 A | 5/2007 | |
| CN | 104250356 A | 12/2014 | |
| DE | 19624299 A1 | 1/1997 | |
| DE | 19621027 A1 | 11/1997 | |
| DE | 19741184 A1 | 3/1999 | |
| DE | 19741187 A1 | 3/1999 | |
| DE | 19805122 A1 | 4/1999 | |
| DE | 19828183 A1 | 12/1999 | |
| DE | 1839199 A1 | 3/2000 | |
| DE | 19840586 A1 | 3/2000 | |
| DE | 19647115 C1 | 5/2000 | |
| EP | 0176609 A1 * | 4/1986 | .......... C08L 2666/04 |
| EP | 0176609 A1 | 4/1986 | |
| EP | 0489941 A1 | 6/1992 | |
| EP | 0771328 | 5/1997 | |
| WO | 2006/112538 A1 | 10/2006 | |

OTHER PUBLICATIONS

International Search Report dated Oct. 20, 2016, in PCT/EP2016/067767, filed Jul. 26, 2016.

* cited by examiner

*Primary Examiner* — Hui H Chin
(74) *Attorney, Agent, or Firm* — Faegre Drinker Biddle & Reath LLP

(57) ABSTRACT

A process for preparing aqueous dispersions of polymers containing oxazoline groups, by aqueous emulsion polymerization initiated by free radicals. The polymerization are carried out in two stages. In the first polymerization stage, an α,β-monoethylenically unsaturated compound having at least one acid group, an monoethylenically unsaturated compound having at least one carboxylic acid amide group, a monoethylenically unsaturated compound having at least one carboxylic acid amide group are copolymerized. In the second polymerization stage, a monoethylenically unsaturated compound having at least one oxazoline group, a monoethylenically unsaturated compound having at least one carboxylic acid amide group and an ethylenically unsaturated compound are copolymerized with the final product from the first polymerization stage.

17 Claims, No Drawings

AQUEOUS DISPERSION OF AN OXAZOLINE GROUP-CONTAINING POLYMER

The present invention provides a process for the preparation of an aqueous polymer dispersion by aqueous emulsion polymerization initiated by free radicals, wherein in an aqueous polymerization medium a) in a first polymerization stage
≥0.1 and ≤15 wt. % of at least one α,β-monoethylenically unsaturated compound having at least one acid group (monomers A1).
≥0 and ≤10 wt. % of at least one monoethylenically unsaturated compound having at least one carboxylic acid amide group (monomers A2),
≥75 and ≤99.9 wt. % of at least one ethylenically unsaturated compound which differs from monomers A1, A2 and B1 (monomers A3),
wherein the amounts of monomers A1 to A3 total 100 wt. %, are subjected to free radical polymerization to give a polymer A, thereafter in the presence of polymer A
b) in a second polymerization stage
≥0.1 and ≤20 wt. % of at least one monoethylenically unsaturated compound having at least one oxazoline group (monomers B1),
≥0 and ≤10 wt. % of at least one monoethylenically unsaturated compound having at least one carboxylic acid amide group (monomers B2),
≥70 and ≤99.9 wt. % of at least one ethylenically unsaturated compound which differs from monomers A1, B1 and B2 (monomers B3)
wherein the amounts of monomers B1 to B3 total 100 wt. %, are subjected to free radical polymerization,
with the proviso that
the weight ratio of the sum of the total amounts of monomers A1 to A3 (total monomer amount A) to the sum of the total amounts of monomers B1 to B3 (total monomer amount B) is in the range of 1:9 to 9:1,
the pH of the aqueous polymerization mixture during the first polymerization stage is <5 and thereafter before the start of the second polymerization stage the pH of the aqueous polymerization mixture is increased to >6 by addition of a base,
wherein the sum of the total amounts of monomers A2 and monomers B2 is ≥0.1 and ≤10 wt. %, based on the sum of total monomer amount A and total monomer amount B (total monomer amount).

The invention also provides the aqueous polymer dispersions themselves which are accessible by the process according to the invention and in particular the use thereof, in particular for improving the tear strength and for increasing the bursting pressure of filter papers under wet conditions.

Aqueous polymer dispersions, the polymer of which from the first polymerization stage comprises an acid monomer and the polymer of which from the second polymerization stage comprises, in copolymerized form, a monomer containing oxazoline groups, processes for the preparation thereof and the crosslinking properties thereof are known from the prior art.

EP-A 176609 thus discloses two-stage self-crosslinking polymers which comprise a monomer having an active hydrogen atom in the first polymerization stage and a monomer containing oxazoline groups in the second polymerization stage, in copolymerized form, and the use thereof in a number of applications, such as, for example, for the preparation of films, adhesives, binders for nonwovens etc. Monomers having a weak or strong acid group, having an aliphatic radical containing hydroxyl groups, having an aromatic radical containing hydroxyl groups, or having an amide group are generally understood to be monomers having active hydrogen atoms, but the monomers having an acid group or an aromatic radical containing hydroxyl groups are disclosed as preferred and monomers having an acid group are disclosed as particularly preferred. Furthermore, in all the examples exclusively monomers containing acid groups, such as, in particular, acrylic acid, but also fumaric acid, are employed as monomers having an active hydrogen atom for the preparation of the first polymer stage. The self-crosslinking properties of the corresponding dispersion polymers were determined by measuring the tensile strength and the elongation at break of the polymer films produced from the dispersion polymers.

EP-A 489941 discloses coating formulations which, in addition to a pigment, a pigment carrier, a thickener, a defoamer, a wetting agent, a dispersing agent and a biocide, also comprise an aqueous dispersion of self-crosslinking two-stage polymers, wherein the two-stage polymer comprises 0.5 to 6 wt. % of a carboxylic acid monomer in the first polymerization stage and 0.25 to 5 wt. % of a monomer containing oxazoline groups in the second polymerization stage, in copolymerized form, in each case based on the total monomer amount of the two-stage polymer.

According to the anonymous Research Disclosure Publication 1986, 261, 23, the use of polymers which comprise isopropenyl-2-oxazoline and at least further monomer which has at least one carbonyl, anhydride or epoxide group, in copolymerized form, is disclosed quite generally for the production of nonwovens.

WO 2006/112538 also discloses, inter alia, two-stage self-crosslinking polymers which comprise a monomer which has a functional group which is reactive towards an oxazoline group in the first polymerization stage and a monomer containing oxazoline groups in the second polymerization stage, in copolymerized form, and the use thereof in a number of applications, such as, for example, for the preparation of coating materials, surface treatment agents, adhesives or sealants etc. The carboxyl group, aromatic thiols and phenolic hydroxyl groups are mentioned explicitly as functional groups which are reactive towards an oxazoline group, the carboxyl group being particularly preferred. In the examples, however, only acrylic acid is employed as a monomer containing carboxyl groups.

The object of the present invention was to provide a process for the preparation of an aqueous polymer dispersion, the self-crosslinking aqueous polymer dispersion of which, as a binder, leads to an improvement in the tear strength and to an increase in the bursting pressure of filter papers under wet conditions.

The object has been achieved by the aqueous polymer dispersions accessible according to the process defined above.

The procedure for carrying out emulsion polymerizations of ethylenically unsaturated compounds (monomers) initiated by free radicals in an aqueous medium has been previously described in many instances and is therefore adequately known by the person skilled in the art (in this context cf. Emulsions polymerisation in Encyclopedia of Polymer Science and Engineering, vol. 8, pages 659 et seq. (1987); D. C. Blackley, in High Polymer Latices, vol. 1, pages 35 et seq. (1966); H. Warson, The Applications of Synthetic Resin Emulsions, chapter 5, pages 246 et seq. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Hölscher, Springer-Verlag, Berlin (1969)]. Aqueous emulsion polymerization initiated by free radicals is conventionally carried out such that the monomers, as a rule co-using dispersing auxiliaries, such as emulsifiers and/or protective colloids, are distributed dispersely in the aqueous medium and subjected to polymerization by means of at least one water-soluble free radical polymerization initiator. Frequently, in the aqueous polymer dispersions obtained the residual contents of unreacted monomers are lowered by chemical and/or physical methods which are likewise known to the person skilled in the art [see, for example, EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is adjusted to a desired value by dilution or concentration, or further conventional additives, such as, for example, foam- or viscosity-modifying additives, are added to the aqueous polymer dispersion. The process according to the invention differs from this general procedure merely in that it is carried out in two stages while maintaining the framework parameters mentioned and the specific monomer compositions.

The following ethylenically unsaturated monomers A1, A2, A3, B1, B2 and B3 can be employed for the preparation by two-stage aqueous emulsion polymerization of the aqueous polymer dispersions accessible by the process according to the invention.

Possible monomers A1 are all α,β-monoethylenically unsaturated compounds which have at least one carboxylic acid and/or phosphoric acid group. Possible α,β-monoethylenically unsaturated compounds which have at least one carboxylic acid group are $C_3$- to $C_6$-, preferably $C_3$- or $C_4$-mono- or -dicarboxylic acids, such as, for example, acrylic acid, methacrylic acid, ethylacrylic acid, itaconic acid, allylacetic acid, crotonic acid, vinylacetic acid, vinyllactic acid, fumaric acid, maleic acid, or 2-methylmaleic acid. However, monomers A1 also include the anhydrides of corresponding α,β-monoethylenically unsaturated dicarboxylic acids, such as, for example, maleic anhydride or 2-methylmaleic anhydride. Preferably, monomers A1 containing carboxylic acid groups are selected from the group comprising acrylic acid, methacrylic acid, itaconic acid, crotonic acid, fumaric acid, maleic acid, vinylacetic acid and vinyllactic acid, where acrylic acid and/or methacrylic acid are particularly preferred. Possible α,β-monoethylenically unsaturated compounds which have at least one phosphoric acid group are, in particular, vinylphosphonic acid and/or (meth)acryloxy (poly)alkoxy phosphate, wherein the (meth)acryloxy (poly)alkoxy phosphate has the following formula I:

$H_2C=CH(H,CH_3)-C(=O)-[AO]_x-O-P(=O)(-OH)_2$,   formula (I)

wherein
AO: represents an ethylenoxy [—$OCH_2CH_2$—], a propylenoxy [—$OCH_2CH(CH_3)$—] or a butylenoxy group [—$OCH_2CH(C_2H_5)$—] or mixtures thereof, wherein the ethylenoxy group is preferred, and
x: represents a number between 1 and 30, wherein numbers between 1 and 20 are preferred and numbers between 1 and 10 are very particularly preferred.

(Meth)acryloxy (poly)alkoxy phosphates which may be mentioned explicitly are compounds of the following formulae:

$H_2C=C(CH_3)-C(=O)-[OCH_2CH_2]_{8-10}-O-P(=O)(-OH)_2$

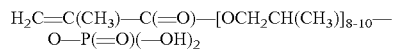

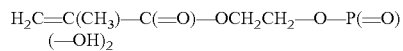

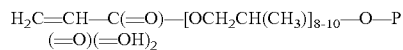

The abovementioned (meth)acryloxy (poly)alkoxy phosphates are commercially obtainable, for example as Sipomer® PAM 100, Sipomer® PAM 200, Sipomer® PAM 300 or Sipomer® PAM 4000 from Solvay/Rhodia.

Monomers A1 also of course include the completely or partially neutralized water-soluble salts, in particular the alkali metal or ammonium salts, of the abovementioned acids.

Monomers A1 which are advantageously employed are acrylic acid, methacrylic acid, itaconic acid, maleic acid, fumaric acid, crotonic acid, vinylacetic acid, vinyllactic acid, vinylphosphonic acid and/or (meth)acryloxy (poly) alkoxy phosphate, such as, in particular, Sipomer® PAM 100, Sipomer® PAM 200, Sipomer® PAM 300 or Sipomer® PAM 4000.

Monomers A2 and/or B2 which can be employed are all monoethylenically unsaturated compounds which have at least one carboxylic acid amide group. These include, above all, the amide derivatives of monomers A1 containing carboxylic acid groups, such as, in particular, (meth acrylic add amide, crotonic acid amide or amides of dicarboxylic acids, e.g. itaconic acid diamide, maleic acid diamide or fumaric acid diamide. Particularly preferred monomers A2 and/or B2 are methacrylic acid amide and/or acrylic acid amide, methacrylic acid amide being very particularly preferred.

Monomers B1 are monoethylenically unsaturated compounds having at least one oxazoline group. In the context of the present invention an oxazoline group designates a heterocyclic compound which comprises a five-membered ring comprising exactly one oxygen atom and exactly one nitrogen atom. In particular, the oxazoline group is a 2-oxazoline group, which can be described by the following structural element.

Preferably, monomers B1 are selected from compounds of the general formula II:

wherein the radicals have the following meanings:
R is a $C_{2-20}$-alkylene radical having an ethylenically unsaturated group;
$R^1, R^2, R^3, R^4$ are selected independently of each other from H, halogen, $C_{1-20}$-alkyl, $C_{2-20}$-alkenyl, $C_{6-20}$-aryl, $C_{7-32}$-arylalkyl, $C_{1-20}$-hydroxyalkyl, $C_{1-20}$-aminoalkyl and $C_{1-20}$-haloalkyl, preferably selected from H, halogen and $C_{1-20}$-alkyl.

In this context in the present case the term "ethylenically unsaturated group" designates a terminal C=C double bond.

The term "alkyl" designates a univalent radical consisting of a linear, branched or cyclic hydrocarbon group, preferably a linear or branched hydrocarbon chain, in particular comprising 1 to 20 carbon atoms, preferably 1 to 18 carbon atoms, particularly preferably 1 to 12 carbon atoms. For example, the alkyl radical can be methyl, ethyl, n-propyl or isopropyl.

The term "alkenyl" designates a univalent radical consisting of a linear or branched hydrocarbon chain, in particular comprising 2 to 20 carbon atoms, preferably 2 to 18 carbon atoms, particularly preferably 2 to 12 carbon atoms, which comprises one or more C=C double bonds, wherein the C=C double bonds can occur within the hydrocarbon chain or at the end of the hydrocarbon chain (terminal C=C double bond). For example, an alkenyl radical can be an allyl radical.

The term "aryl" designates a substituted or unsubstituted aromatic hydrocarbon group, in particular comprising 6 to 20 carbon atoms. Preferably, the aryl radical is a phenyl group.

The term "arylalkyl" designates a univalent radical derived from a linear or branched alkyl radical, in particular comprising 1 to 20 carbon atoms, preferably 2 to 18 carbon atoms, particularly preferably 2 to 12 carbon atoms, by exchange of one or more hydrogen atoms for an aryl group, wherein the aryl group is a substituted or unsubstituted aromatic hydrocarbon group, in particular comprising 6 to 14 carbon atoms. Preferably, the aromatic hydrocarbon group is phenyl and the arylalkyl radical is a benzyl radical.

The term "halogen" designates a substituent selected from fluorine, chlorine, bromine or iodine, preferably chlorine.

The term "haloalkyl" designates a univalent radical derived from a linear or brandied alkyl radical, in particular comprising 2 to 20 carbon atoms, preferably 2 to 18 carbon atoms, particularly preferably 2 to 12 carbon atoms, in which one or more hydrogen atoms are replaced by a halogen atom (—F, —Cl, —Br, —I, in particular Cl). The same applies accordingly for the hydroxyalkyl and aminoalkyl radicals, where one or more hydrogen atoms are replaced by a hydroxyl or, respectively, amino group.

Preferably, R is a $C_{1-10}$-alkenyl radical, preferably a $C_{1-6}$-alkenyl radical comprising at least one ethylenically unsaturated group. In a preferred embodiment the radical R comprises exactly one ethylenically unsaturated group. The radical R is selected in particular from vinyl, allyl, isopropenyl (2-propen-2-yl), 2-propen-1-yl, 3-buten-1-yl, or 4-buten-1-yl. In particular, R is preferably vinyl or isopropenyl, particularly preferably isopropenyl.

Preferably, the radicals $R^1$, $R^2$, $R^3$ and $R^4$ are selected independently of each other from H (represents hydrogen atom), halogen, $C_{1-10}$-alkyl, $C_{6-12}$-aryl, $C_{7-13}$-alkylaryl, $C_{1-10}$-alkoxy, $C_{1-10}$-hydroxyalkyl, $C_{1-10}$-aminoalkyl and $C_{1-10}$-haloalkyl, in particular selected from H and $C_{1-6}$-alkyl, particularly preferably from H, methyl, ethyl, n-propyl, isopropyl, n-butyl, n-pentyl and n-hexyl, in particular selected from H, methyl and ethyl. In a preferred embodiment at least two of the radicals $R^1$, $R^1$, $R^3$ and $R^4$ are H. In a preferred embodiment the radicals $R^1$ and $R^2$ are H. In a further preferred embodiment all the radicals $R^1$, $R^2$, $R^3$ and $R^4$ are H. In a further preferred embodiment at least two of the radicals $R^1$, $R^2$, $R^3$ and $R^4$ are H.

In a further preferred embodiment the radicals $R^1$, $R^2$, $R^3$ and $R^4$ are selected independently of each other from H, methyl and ethyl and at least two of the radicals $R^1$, $R^2$, $R^3$ and $R^4$ are H, where the radicals $R^1$ and $R^2$ are preferably H.

Monomers B1 which are in particular preferably employed are, however, 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-4,4-dimethyl-2-oxazoline, 2-vinyl-5,5-dimethyl-2-oxazoline, 2-vinyl-4,4,5,5-tetramethyl-2-oxazoline, 2-isopropenyl-2-oxazoline, 2-isopropenyl-4-methyl-2-oxazoline, 2-isopropenyl-5-methyl-2-oxazoline, 2-isopropenyl-4-ethyl-2-oxazoline, 2-isopropenyl-5-ethyl-2-oxazoline, 2-isopropenyl-4,4-dimethyl-2-oxazoline, 2-isopropenyl-5,5-dimethyl-2-oxazoline and/or 2-isopropenyl-4,4,5,5-tetramethyl-2-oxazoline. The use of 2-vinyl-2-oxazoline and/or 2-isopropenyl-2-oxazoline is particularly preferred, 2-isopropenyl-2-oxazoline being preferred in particular.

Monomers A3 which can be employed are all ethylenically unsaturated compounds which differ from monomers A1, A2 and B1 and monomers B3 which can be employed are all ethylenically unsaturated compounds which differ from monomers A1, B1 and B2, such as, for example, (meth)acrylic acid alkyl esters, wherein preferably those (meth)acrylic acid alkyl esters of which the linear or branched alkyl radical has 1 to 20 carbon atoms, particularly preferably 1 to 10, very particularly preferably 1 to 8 and in particular 1 to 4 carbon atoms, are intended to be included. It is of importance in this connection that the written form "(meth)acrylic acid" compounds or "(meth)acrylate" compounds is intended generally to include both the corresponding acrylic acid compounds and the corresponding methacrylic acid compounds.

Examples which are to be mentioned for (meth)acrylic acid alkyl esters are (meth)acrylic acid methyl ester, (meth)acrylic acid ethyl ester, (meth)acrylic acid n-propyl ester, (meth)acrylic acid n-butyl ester, (meth)acrylic acid isobutyl ester, (meth)acrylic acid sec-butyl ester, (meth)acrylic acid n-pentyl ester, (meth)acrylic acid isopentyl ester, (meth)acrylic acid 2-methylbutyl ester, (meth)acrylic acid amyl ester, (meth)acrylic acid n-hexyl ester, (meth)acrylic acid 2-ethylbutyl ester, (meth)acrylic acid pentyl ester, (meth)acrylic acid n-heptyl ester, (meth)acrylic acid n-octyl ester, (meth)acrylic acid 2-ethylhexyl ester, (meth)acrylic acid 2-propylheptyl ester, (meth)acrylic acid n-decyl ester, (meth)acrylic acid undecyl ester and/or (meth)acrylic acid n-dodecyl ester.

Preferred (meth)acrylic acid alkyl esters are methyl methacrylate, methyl acrylate, ethyl acrylate, n-butyl acrylate, n-hexyl acrylate, n-octyl acrylate, 2-ethylhexyl acrylate and/or 3-propylheptyl acrylate.

Possible monomers A3 and B3 are advantageously also vinylaromatics having up to 20 C. atoms.

The vinylaromatics having up to 20 C atoms are optionally substituted aromatic systems having a vinyl group in conjugation to the aromatic ring system.

Such substituted vinylaromatics frequently have one or more, preferably one, linear or branched alkyl groups, which can be on the aromatic radical or on the vinyl group, having 1 to 10, often 1 to 6 and preferably 1 to 4 carbon atoms. If the substituent is on the aromatic radical, the substituent can preferably be in the ortho or para position, particularly preferably in the para position to the vinyl group.

Possible vinylaromatic compounds are, in particular, vinyltoluene, vinylnaphthalene, α- and p-methylstyrene, α-butylstyrene, 4-n-butylstyrene, 4-n-decylstyrene and/or styrene, but styrene and/or α-methylstyrene are particularly preferred.

Monomers A3 and B3 also include, however, ethylenically unsaturated nitriles having up to 20 C atoms, such as, in particular, fumaric acid dinitrile, acrylonitrile and methacrylonitrile, preferably acrylonitrile and methacrylonitrile and particularly preferably acrylonitrile, vinyl esters of carboxylic acids containing up to 20 C atoms, such as, in particular, vinyl laurate, vinyl stearate, vinyl propionate, versatic acid vinyl ester, vinyl butyrate and vinyl acetate, but preferably vinyl acetate, vinyl and vinylidene halides having up to 10 C atoms, such as, in particular, ethylenically unsaturated compounds substituted by chlorine, fluorine or bromine, preferably vinyl chloride and vinylidene chloride, and vinyl ethers of alcohols containing 1 to 10 C atoms, such as, advantageously, methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether and n-octyl vinyl ether, where vinyl ethers of alcohols containing 1 to 4 C atoms are preferred.

Monomers A3 and B3 can also comprise the following functionalized ethylenically unsaturated monomers to a minor extent, i.e. ≤20 wt. %, advantageously ≤10 wt. % and in particular advantageously ≤5 wt. %, in each case based on the total amount of monomers A3 and, respectively, B3.

Possible functionalized ethylenically unsaturated monomers are all monoethylenically unsaturated compounds having at least one hydroxyl group, such as, in particular, all hydroxyalkyl, advantageously hydroxy-$C_2$-$C_{10}$-alkyl, preferably hydroxy-$C_2$-$C_4$-alkyl and particularly advantageously hydroxy-$C_2$-$C_3$-alkyl acrylates and/or methacrylates, wherein in the context of this specification the alkoxylated hydroxyalkyl acrylates and/or -methacrylates, i.e. those reacted with alkylene oxides (essentially ethylene oxide and propylene oxide), are to be regarded as monomers B1 and B2. Advantageously, the monomer B1 and B2 containing hydroxyalkyl groups is selected from the group comprising diethylene glycol monoacrylate, 4-hydroxybutyl acrylate, 3-hydroxypropyl acrylate, 2-hydroxypropyl acrylate, 2-hydroxyethyl acrylate, diethylene glycol monomethacrylate, 4-hydroxybutyl methacrylate, 3-hydroxypropyl methacrylate, 2-hydroxypropyl methacrylate and 2-hydroxyethyl methacrylate. In particular advantageously, 2-hydroxyethyl acrylate and/or 2-hydroxyethyl methacrylate is employed, 2-hydroxyethyl methacrylate being particularly preferred.

In this context the functionalized ethylenically unsaturated monomers are intended to also include those hydroxyalkyl acrylates and methacrylates which have more than one hydroxyl group, for example two to five, preferably two to four, particularly preferably two to three hydroxyl groups. Examples of these are glycerol monoacrylate and methacrylate, trimethylolpropane monoacrylate and methacrylate, pentaerythritol monoacrylate and methacrylate and monoacrylates and methacrylates of sugar alcohols, such as, for example, sorbitol, mannitol, diglycerol, threitol, erythritol, adonitol (ribitol), arabitol (lyxitol), xylital, dulcitol (galactitol), maltitol and isomaltol.

The functionalized ethylenically unsaturated compounds which can be employed according to the invention also include organic compounds which have at least two non-conjugated ethylenically unsaturated groups, such as, for example, 1,2-, 1,3- and 1,4-butanediol diacrylate, 1,2- and 1,3-propylene glycol (meth)acrylate, 1,6-hexanediol di(meth)acrylate, 1,2-ethylene glycol di(meth)acrylate, neopentyl glycol di(meth)acrylate, diethylene glycol di(meth)acrylate, triethylene glycol di(meth)acrylate, tetraethylene glycol di(meth)acrylate, trimethylolpropane tri(meth)acrylate, trimethylolethane tri(meth)acrylate, pentaerythritol tri- and tetra(meth)acrylate, allyl methacrylate, 1,2-, 1,3- and 1,4-divinylbenzene and mixtures thereof. These compounds are particularly preferably selected from the group consisting of divinylbenzene, 1,4-butanediol diacrylate and allyl methacrylate.

Further functionalized ethylenically unsaturated compounds which can be employed according to the invention are selected from the group consisting of (meth)acrylic acid 2-(2-oxoimidazolidin-1-yl)ethyl ester (ureidoethyl (meth)acrylate), N-[2-(2-oxooxazolidin-3-yl)ethyl] methacrylate, acetoacetoxyethyl acrylate, acetoacetoxypropyl methacrylate, acetoacetoxybutyl methacrylate, 2-(acetoacetoxy)ethyl methacrylate, diacetone acrylamide (DAAM) and diacetone methacrylamide. Preferred compounds in this group are (meth)acrylic acid 2-(2-oxoimidazolidin-1-yl)ethyl ester, (acetoacetoxy)ethyl methacrylate, diacetone acrylamide and/or diacetone methacrylamide, and (meth)acrylic acid 2-(2-oxoimidazolidin-1-yl)ethyl ester and (acetoacetoxy)ethyl methacrylate are particularly preferred.

The functionalized ethylenically unsaturated compounds which can be employed according to the invention also include, however, compounds having a (meth)acrylate and an epoxide group. There may be mentioned in particular glycidyl acrylate and glycidyl methacrylate, preferably glycidyl methacrylate.

It is of importance according to the invention that the abovementioned monomers A1 to A3 and B1 to B3 are employed individually or also as a mixture. In each case the total or partial amounts of monomers A1 to A3 can be initially introduced in the aqueous polymerization medium before initiation of the polymerization reaction and the partial amounts which may remain can be metered in under the polymerization conditions. However, it is also possible to meter the total amounts of monomers A1 to A3 (total monomer amount A) into the aqueous polymerization medium under the polymerization conditions. In one embodiment in the first polymerization stage at least a partial amount of ≤10 wt. % of the total monomer amount. A is initially introduced in the aqueous polymerization medium before initiation of the polymerization reaction and the remaining residual amount is metered into the aqueous polymerization medium under the polymerization conditions, while in the second polymerization stage the total amount of monomers B1 to B3 (total monomer amount B) is metered into the aqueous polymerization medium under the polymerization conditions. In this context monomers A1 to A3 and B1 to B3 can be metered into the aqueous polymerization medium in each case in individual streams, as a monomer mixture or in the form of an aqueous monomer emulsion, discontinuously as well as continuously with constant or changing flow quantities.

However, the monomers of the first and the second polymerization stage are particularly advantageously in each case employed as monomer mixtures, in particular advantageously as aqueous monomer emulsions. Advantageously, at least ≥90 wt. % and in particular advantageously the total amounts of the monomer mixtures of the first and the second polymerization stage are metered into the aqueous polymerization medium as aqueous monomer emulsions under the polymerization conditions.

Advantageously according to the invention, the total amount of monomers A1 is ≥4.0 and ≤12 wt. % and preferably ≥5.0 and ≤10 wt. %, in each case based on the total monomer amount A.

Advantageously according to the invention, the total amount of monomers B1 is ≥0.5 and ≤5.0 wt. % and preferably ≥1.0 and ≤3.0 wt. %, in each case based on the total monomer amount B.

In the process according to the invention the total amount of monomers A1 in the first polymerization stage and the total amount of monomers B1 in the second polymerization stage are advantageously chosen, however, such that the molar ratio of acid groups to oxazoline groups is ≥1.5, preferably ≥3 and in particular preferably ≥5.

The monomers containing carboxylic acid amide groups can be added according to the invention in the first polymerization stage (monomers A2) or in the second polymerization stage (monomers B2) or alternatively, both in the first and in the second polymerization stage. Advantageously according to the invention, the monomers containing carboxylic acid amide groups are employed both in the first and in the second polymerization stage. In this context the amounts ratio of monomers A2 to monomers B2 is advantageously in the range of 30:70 to 70:30 and in particular advantageously in the range of 40:60 to 60:40. In this context the total amount of monomers A2 and monomers B2 is preferably a ≥1.0 and ≤3.0 wt. % and particularly preferably ≥1.5 and ≤2.5 wt. %, in each case based on the total monomer amount.

According to the invention the weight ratio of total monomer amount A to total monomer amount B is in the range of from 1:9 to 9:1, advantageously in the range of from 1:2 to 2:1 and in particular advantageously in the range of from 1:1.5 to 1.5:1 and preferably in the range of 1:1.2 to 1.2:1.

In a preferred embodiment, in the process according to the invention

≥4.0 and ≤12 wt. % of monomers A1,
≥1.0 and ≤3.0 wt. % of monomers A2,
≥85 and ≤95 wt. % of monomers A3,
and particularly advantageously
≥5.0 and ≤10 wt. % of monomers A1,
≥1.5 and ≤2.5 wt. % of monomers A2,
≥88 and ≤93.5 wt. % of monomers A3
are employed in the first polymerization stage.

In the second polymerization stage of the process according to the invention, in the preferred embodiment ≥0.5 and ≤5.0 wt. % of monomers B1,
≥1.0 and ≤3.0 wt. % of monomers B2,
≥92% and ≤99 wt. % of monomers B3,
and particularly advantageously
≥1.0 and ≤3.0 wt. % of monomers B1,
≥1.5 and ≤2.5 wt. % of monomers B2,
≥94.5 and ≤97.5 wt. % of monomers B3
are employed.

In a particularly preferred embodiment, in the abovementioned embodiments acrylic acid and/or methacrylic acid are employed as monomers A1, acrylamide and/or methacrylamide are employed as monomers A2 and B2, styrene and n-butyl acrylate are employed as monomers A3 and B3 and isopropenyl-2-oxazoline is employed as monomer B1.

The aqueous emulsion polymerization initiated by free radicals for the preparation of the dispersion polymers is as a rule carried out in the presence of a free radical polymerization initiator (free radical initiator). Possible free radical initiators are all those which are capable of initiating a free radical aqueous emulsion polymerization. These can be in principle both peroxides and azo compounds. Redox initiator systems are of course also possible. Peroxides which can be employed are in principle inorganic peroxides, such as hydrogen peroxide or peroxodisulfates, such as the mono- or di-alkali metal or ammonium salts of peroxodisulfuric acid, such as, for example, mono- and di-sodium, -potassium or ammonium salts thereof, or organic peroxides, such as alkyl hydroperoxides, for example tert-butyl, p-menthyl or cumyl hydroperoxide, as well as dialkyl or diaryl peroxides, such as di-tert-butyl or dicumyl peroxide. 2,2'-Azobis(isobutyronitrile), 2,2'-azobis(2,4-dimethylvaleronitrile) and 2,2'-azobis(amidinopropyl) dihydrochloride (AIBA, corresponds to V-50 from Wako Chemicals) are essentially used as the azo compound. So-called redox initiator systems can of course also be employed as free radical initiators. Possible oxidizing agents for redox initiator systems are essentially the abovementioned peroxides. Corresponding reducing agents which can be employed are sulfur compounds of low oxidation number, such as alkali metal sulfites, for example potassium and/or sodium sulfite, alkali metal hydrogen sulfites, for example potassium and/or sodium hydrogen sulfite, alkali metal metabisulfites, for example potassium and/or sodium metabisulfites, formaldehydesulfoxylates, for example potassium and/or sodium formaldehydesulfoxylate, alkali metal salts, specifically potassium and/or sodium salts, of sulfinic acids and alkali metal hydrogen sulfides, such as, for example, potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone.

Initiation of the polymerization reaction is understood as meaning starting the polymerization reaction of the monomers present in the polymerization vessel after free radical formation of the free radical initiator. In this context the initiation of the polymerization reaction can be carried out by addition of the free radical initiator to the aqueous polymerization mixture in the polymerization vessel under the polymerization conditions. However, it is also possible for a partial or the total amount of the free radical initiator to be added to the aqueous polymerization mixture, containing the monomers which have been initially introduced, in the polymerization vessel under conditions which are not suitable for triggering a polymerization reaction, for example at a low temperature, and thereafter for polymerization conditions to be established in the aqueous polymerization mixture. Polymerization conditions in this context are to be understood generally as meaning those temperatures and pressures under which the aqueous emulsion polymerization initiated by free radicals proceeds at an adequate polymerization speed. They depend in particular on the free radical initiator used. Advantageously, the nature and amount of the free radical initiator, the polymerization temperature and the polymerization pressure are chosen such that the free radical initiator has a half-life of <3 hours and in particular advantageously <1 hour and thereby enough starting free radicals are always available in order to initiate and maintain the polymerization reaction.

A possible reaction temperature for the aqueous emulsion polymerization initiated by free radicals is the entire range from 0 to 170° C. In this context as a rule temperatures of from 50 to 120° C., preferably 60 to 110° C. and in particular preferably 60 to 100° C. are used. The aqueous emulsion polymerization initiated by free radicals can be carried out under a pressure of less than equal to or greater than 1 atm [1.013 bar (absolute), atmospheric pressure], so that the polymerization temperature can exceed 100° C. and can be up to 170° C. In the presence of monomers A1 to B3 of low boiling point the emulsion polymerization is preferably carried out under increased pressure. In this context the pressure can assume 1.2, 1.5, 2, 5, 10, 15 bar (absolute) or still higher values. If the emulsion polymerization is carried out under reduced pressure, pressures of 950 mbar, frequently of 900 mbar and often 850 mbar (absolute) are established. Advantageously, the free radical aqueous emulsion polymerization is carried out under 1 atm with exclusion of oxygen, in particular under an inert gas atmosphere, such as, for example, under nitrogen or argon.

According to the invention the total amount of the free radical initiator can be initially introduced in the aqueous reaction medium before initiation of the polymerization reaction. However, it is also possible optionally initially to introduce only a partial amount of the free radical initiator in the aqueous reaction medium before initiation of the polymerization reaction and then to add under the polymerization conditions, during the emulsion polymerization initiated by free radicals, the total amount or the residual amount optionally remaining continuously or discontinuously in the first and/or second polymerization stage according to the consumption. Different free radical initiators in different amounts can of course be employed in the first and in the second polymerization stage. In a preferred embodiment the total amount of the free radical initiator is initially introduced in the aqueous reaction medium before initiation of the polymerization reaction.

As a rule the total amount of free radical initiators is ≥0.05 and ≤5 wt. %, preferably ≥0.1 and ≤3 wt. % and particularly preferably ≥0.1 and ≤1.5 wt. %, in each case based on the total monomer amount.

To adjust the weight-average molecular weights of the polymers formed in the first and in the second polymerization stage free radical chain transfer compounds (free radical chain regulators) can be employed. Compounds essentially employed in this context are aliphatic and/or araliphatic halogen compounds, such as, for example, n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, such as, for example, ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethial, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, such as, for example, 2-hydroxyethanethiol, aromatic thiols, such as benzenethiol, ortho-, meta- or para-methylbenzenethiol, mercaptoalkanaic acids and derivatives thereof, such as 3-mercaptopropionic acid 6-methylheptyl ester or 2-mercaptoethanoic acid 2-ethylhexyl ester and all further sulfur compounds described in Polymer Handbook 3rd edition, 1989, J. Brandrup and E. H. Immergut, John Wiley & Sons, section II, pages 133 to 141, but also aliphatic and/or aromatic aldehydes, such as acetaldehyde, propionaldehyde and/or benzaldehyde, unsaturated fatty acids, such as oleic acid, dienes having non-conjugated double bonds, such as divinylmethane or vinylcyclohexane or hydrocarbons having easily abstractable hydrogen atoms, such as, for example, toluene. It is also possible, however, to employ mixtures of the abovementioned free radical chain regulators which do not interfere with each other.

According to the invention the total amount of the free radical chain regulator can be initially introduced in the aqueous reaction medium before initiation of the polymerization reaction. However, it is also possible optionally initially to introduce only a partial amount of the free radical chain regulator in the aqueous reaction medium before initiation of the polymerization reaction and then to add under the polymerization conditions, during the emulsion polymerization initiated by free radicals, the total amount or the residual amount optionally remaining continuously or discontinuously in the first and/or second polymerization stage as required. Different free radical chain regulators in different amounts can of course be employed in the first and in the second polymerization stage.

As a rule the total amount of free radical chain regulator is a ≥0 and ≤5 wt. %, preferably ≥0 and ≤2 wt. % and particularly preferably ≥0 and ≤1 wt. %, in each case based on the total monomer amount.

Advantageously, the process according to the invention is carried out in the presence of dispersing auxiliaries which keep both the monomer droplets and the polymer particles in disperse distribution in the aqueous phase and in this way ensure the stability of the aqueous dispersions produced from the dispersion polymers. Possible such auxiliaries are both the protective colloids conventionally employed for carrying out free radical aqueous emulsion polymerizations and emulsifiers.

Suitable protective colloids are, for example, copolymers comprising polyvinyl alcohols, cellulose derivatives or vinylpyrrolidone. A detailed description of further suitable protective colloids is to be found in Houben-Weyl, Methoden der organischen Chemie, volume XIV/1, Makromolekulare Stoffe, pages 411 to 420, Georg-Thieme-Verlag, Stuttgart, 1961. Mixtures of emulsifiers and/or protective colloids can of course also be used. Preferably, emulsifiers of which the relative molecular weights are conventionally below 1,000, in contrast to the protective colloids, are exclusively employed as dispersing auxiliaries. They can be anionic, cationic or nonionic in nature. In the case where mixtures of surface-active substances are used the individual components must of course be compatible with one another, which can be investigated with the aid of a few preliminary experiments in cases of doubt. In general anionic emulsifiers are compatible with one another and with nonionic emulsifiers. The same also applies to cationic emulsifiers, while anionic and cationic emulsifiers usually are not compatible with one another. The usual emulsifiers are e.g. ethoxylated mono-, di- and trialkylphenols (degree of EO: 3 to 50, alkyl radical: C4 to C12), ethoxylated fatty alcohols (degree of EO: 3 to 50; alkyl radical: C8 to C36) and alkali metal and ammonium salts of alkyl sulfates (alkyl radical: C8 to C12), of sulfuric acid half-esters of ethoxylated alkanols (degree of EO: 4 to 30, alkyl radical: C12 to C18) and ethoxylated alkylphenols (degree of ethoxylation: 3 to 50, alkyl radical: C4 to C12), of alkylsulfonic acids (alkyl radical: C12 to C18) and of alkylarylsulfonic acids (alkyl radical: C9 to C18). Further suitable emulsifiers are to be found in Houben-Weyl, Methoden der organischen Chemie, volume XIV/1, Makromolekulare Stoffe, pages 192 to 208, Georg-Thieme-Verlag, Stuttgart, 1961.

Surface-active substances which have proved suitable are furtherer ore compounds of the general formula III

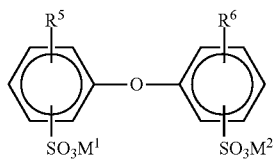

formula (III)

wherein $R^5$ and $R^6$ denote H atoms or $C_4$- to $C_{24}$-alkyl and are not simultaneously H atoms, and $M^1$ and $M^2$ can be alkali metal ions and/or ammonium ions. In the general formula III $R^5$ and $R^6$ preferably denote linear or branched alkyl radicals having 6 to 18 C atoms, in particular having 6, 12 and 16 C atoms, or hydrogen, wherein $R^5$ and $R^6$ are not both simultaneously H atoms. $M^1$ and $M^2$ are preferably sodium, potassium or ammonium, wherein sodium is particularly preferred. Particularly advantageous compounds of the general formula III are those in which $M^1$ and $M^2$ are sodium, $R^5$ is a branched alkyl radical having 12 C atoms and $R^6$ is an H atom or $R^5$. Technical grade mixtures which have a content of from 50 to 90 wt. % of the monoalkylated product, such as, for example, Dowfax® 2A1 (brand of Dow Chemical Company) are frequently used. The compounds of the general formula III are generally known, e.g. from U.S. Pat. No. 4,269,749, and commercially obtainable.

If dispersing auxiliaries are employed according to the invention, advantageously anionic and/or nonionic and in particular advantageously anionic surfactants are used.

In a specific embodiment of the present invention emulsifiers which can be employed are those which are incorporated into the polymer during the free radical emulsion polymerization. These are as a rule compounds which carry at least one group which can be polymerized by free radicals, preferably selected from the group consisting of allyl, acrylate, methacrylate and vinyl ether, and at least one group having an emulsifying action, preferably selected from the abovementioned group.

These are, for example, emulsifiers which can be incorporated of the brands Bisomer® MPEG 350 MA of Laporte, Hitenol® BC-20 (APEO), Hitenol® BC-2020, Hitenol® KH-10 or Noigen® RN-50 (APEO) of Dai-Ichi Kogyo Seiyaku Co., Ltd., Maxemul® 6106, Maxemul® 6112, Maxemul® 5010, Maxemul® 5011 of Croda, Sipomer® PAM 100, Sipomer® PAM 200, Sipomer® PAM 300, Sipomer® PAM 4000, Sipomer® PAM 5000 of Rhodia, Adeka® Reasoap® PP-70, Adeka® Reasoap® NE-10, Adeka® Reasoap® NE-20, Adeka® Reasoap® NE-30, Adeka® Reasoap® NE-40, Adeka® Reasoap® SE-10N, Adeka® Reasoap® SE-1025A, Adeka® Reasoap® SR-10, Adeka® Reasoap® SR-1025, Adeka® Reasoap® SR-20, Adeka® Reasoap® ER-10, Adeka® Reasoap® ER-20, Adeka® Reasoap® ER-30, Adeka® Reasoap® ER-40 of Adeka, Pluriol® A 010 R, Pluriol® A 12 R, Pluriol® A 23 R, Pluriol® A 46 R, Pluriol® A 750 R, Pluriol® A 950 R, Pluriol® A 590 I, Pluriol® A 1190 I, Pluriol® A 590 V, Pluriol® A 1190 V, Pluriol® A 5890 V, Pluriol® A 308 R and DAA ES 8761 of BASF SE, Latemul® S 180 A and Latemul® S 180 of Kao, Eleminol® JS-2 of Sanyou Kasei, Aquaron® HS-1025 of Dai-Ichi Kogyo Seiyaku and C12-AMPS of Lubrizol.

As a rule the total amount of dispersing auxiliaries is ≥0.05 and ≤3 wt. %, preferably ≥0.1 and ≤2 wt. % and particularly preferably ≥0.5 and ≤1.5 wt. %, in each case based on the total monomer amount.

According to the invention the total amount of dispersing auxiliary employed can be initially introduced in the aqueous reaction medium before initiation of the polymerization reaction. However, it is also possible optionally initially to introduce only a partial amount of the dispersing auxiliary in the aqueous reaction medium before initiation of the polymerization reaction and then to add under the polymerization conditions, during the emulsion polymerization initiated by free radicals, the total amount or the residual amount optionally remaining continuously or discontinuously in the first and/or second polymerization stage as required. Different dispersing auxiliaries in different amounts can of course be employed in the first and in the second polymerization stage. Advantageously, a partial amount (≤50 wt. %) of the dispersing auxiliaries is initially introduced in the reaction vessel and the remaining residual amounts (≥50 wt. %) are metered continuously into the first and into the second polymerization stage.

It is of importance furthermore that in the process according to the invention in a preferred embodiment the nature and amount of monomers A1 to A3 and/or of monomers B1 to B3 are chosen such that a polymer built up solely from these monomers has a glass transition temperature measured in accordance with DIN EN ISO 11357-2 (2013 September) [differential thermoanalysis, midpoint temperature, heating up rate 20 K/min] in the range of ≥−15 and ≤100° C. and in particular preferably ≥0 and ≤50° C.

In this context the person skilled in the art is familiar with the fact that according to Fox (T. G. Fox, Bull. Am. Phys. Soc. 1956 [ser. II] 1, page 123 and according to Ullmann's Encyclopeädie der technischen Chemie, vol. 19, page 18, 4th edition, Verlag Chemie, Weinheim, 1980) the glass transition temperature of at most weakly crosslinked copolymers can be estimated in good approximation using the following formula $$1/Tg = x_1/Tg^1 + x_2/Tg^2 + \ldots x_n/Tg^n$$

wherein $x_1, x_2, \ldots x_n$, denote the mass fragments of the monomers $1, 2, \ldots n$ and $Tg^1, Tg^2, \ldots Tg^n$ denote the glass transition temperatures of the particular polymers in each case built up from only one of the monomers $1, 2, \ldots n$ in degrees kelvin. The glass transition temperatures of these homopolymers of most ethylenically unsaturated monomers are known (or can be determined experimentally in a manner known per se) and are listed, for example, in J. Brandrup, E. H. Immergut, Polymer Handbook 1st ed. J. Wiley, New York, 1966, 2nd ed. J. Wiley, New York, 1975 and 3rd ed. J. Wiley, New York, 1989, and in Ullmann's Encyclopedia of Industrial Chemistry, page 169, Verlag Chemie, Weinheim, 1992.

It is essential furthermore that the aqueous emulsion polymerization initiated by free radicals in the first polymerization stage can advantageously also be carried out in the presence of a polymer seed, for example in the presence of from 0.01 to 10 wt. %, frequently from 0.05 to 7.0 wt. % and often from 0.1 to 4.0 wt. % of a polymer seed, in each case based on the total monomer amount A.

A polymer seed is employed according to the invention in particular if the particle size of the polymer particles to be prepared by means of an aqueous emulsion polymerization initiated by free radicals is to be established in a targeted manner (in this context see, for example, U.S. Pat. Nos. 2,520,959 and 3,397,165).

In particular, in the process according to the invention a polymer seed of which the polymer seed particles have a weight-average diameter Dw of ≤100 nm, frequently ≥5 nm to ≤50 nm and often ≥15 nm to ≤35 nm is employed.

The polymer seed is conventionally employed in the form of an aqueous polymer dispersion.

If a polymer seed is used, a foreign polymer seed is advantageously employed. In contrast to a so-called in situ polymer seed which is prepared in the reaction vessel before the start of the actual emulsion polymerization and which as a rule has the same monomer composition as the polymer A prepared by the subsequent aqueous emulsion polymerization initiated by free radicals, a foreign polymer seed is understood as meaning a polymer seed which has been prepared in a separate reaction step and the monomer composition of which differs from the polymer A prepared by the aqueous emulsion polymerization initiated by free radicals, which, however, means nothing other than that different monomers or monomer mixtures with a different composition are employed for the preparation of the foreign polymer seed and for the preparation of the aqueous polymer dispersion. The person skilled in the art is familiar with the preparation of a foreign polymer seed, which is conventionally carried out such that a relatively small amount of monomers and a relatively large amount of emulsifiers are initially introduced in a reaction vessel and a sufficient amount of polymerization initiator is added at the reaction temperature.

Preferably according to the invention, a polymer foreign seed having a glass transition temperature of ≥50° C., frequently ≥60° C. or ≥70° C. and often ≥80° C. or ≥90° C. is employed. A polystyrene or a polymethyl methacrylate polymer is preferred in particular.

The total amount of foreign polymer seed can be initially introduced in the polymerization vessel. However, it is also possible initially to introduce only a partial amount of the foreign polymer seed in the polymerization vessel and to add the remaining residual amount together with monomers A1 to A3 during the polymerization. If necessary, however, the total polymer seed amount can also be added in the course of the polymerization. Preferably, the total amount of foreign polymer seed is initially introduced in the polymerization vessel before initiation of the polymerization reaction.

It is essential to the process that the pH of the aqueous polymerization mixture during the first polymerization stage is <5, preferably <4.5 and in particular preferably ≤4. When the first polymerization stage has ended, i.e. after the total monomer amount A has reacted to the extent of ≥95 wt. %, advantageously to the extent of ≥98 wt. % and in particular advantageously to the extent of ≥99 wt. %, and before the start of the second polymerization stage, i.e. before monomers B1 to B3 are metered in, the pH of the aqueous polymerization mixture is increased to a value of >6, advantageously ≥7 and in particular ≥8 by addition of a base. Advantageously according to the invention, the pH measurement or pH control is carried out directly in the aqueous polymerization medium at the polymerization temperature by means of a calibrated high temperature pH electrode, such as, in particular, an InPro® 325X from Mettler Toledo.

According to the invention, all the conventional bases can be employed, such as alkali metal, alkaline earth metal or ammonium hydroxides or carbonates or bicarbonates, such as, for example, NaOH, KOH, NH$_4$OH, Ca(OH)$_2$, Na$_2$CO$_3$, K$_2$CO$_3$ (NH$_4$)$_2$CO$_3$, NaHCO$_3$, KHCO$_3$ or NH$_4$HCO$_3$. Suitable bases are likewise ammonia and primary, secondary or tertiary organic amines, such as, for example, methylamine, ethylamine, 1-propylamine, 2-propylamine, 1-n-butylamine, 2-n-butylamine, 2-methyl-1-propylamine, 2-methyl-2-propylamine etc., dimethylamine, diethylamine, di-n-propylamine, diisopropylamine, di-n-butylamine, di-2-methylpropylamine etc., trimethylamine, triethylamine, tri-n-propylamine, triisopropylamine, tri-n-butylamine, tri-2-methylpropylamine etc., but also mixed amines, such as N-methyl-N-ethylamine, N,N-dimethyl-N-ethylamine etc. Advantageously, however, those bases which have a boiling point of ≤20° C., advantageously ≤10° C. and in particular advantageously ≤0° C. under a pressure of 1,013 bar (absolute) are employed for increasing the pH before the second polymerization stage, such as, in particular, ammonia, in particular in the form of its aqueous solution or its basic salts (NH$_4$)$_2$CO$_3$, NH$_4$HCO$_3$, where ammonia, however, in particular in the form of its aqueous solution, is particularly preferred.

The aqueous polymer dispersion obtained after the second polymerization stage comprises polymer particles of which the weight-average particle diameters are in the range of ≥50 and ≤500 nm, advantageously in the range of ≥60 and ≤200 nm and in particular in the range of ≥80 and ≤200 nm. The determination of the weight-average particle diameters is carried out according to the invention in accordance with ISO 13321 using a High Performance Particle Sizer from Malvern at 22° C. and a wavelength of 633 nm.

The aqueous polymer dispersions accessible by the process according to the invention are of course also included in a preferred embodiment.

It is of importance furthermore that the aqueous polymer dispersions accessible by the process according to the invention can advantageously be used as binders in the preparation of adhesives, sealing compositions, synthetic resin plasters, paper coating compositions, fiber nonwovens, flexible roof coatings and paints as well as in sand hardening, as components in the preparation of textile or leather auxiliaries and impact modifiers or for modification of mineral binders and synthetic materials.

The aqueous polymer dispersions accessible by the process according to the invention can be used in particular advantageously for improving the tear strength and for increasing the bursting pressure of filter papers under wet conditions. It is of importance furthermore that the aqueous polymer dispersions according to the invention are distinguished by a good electrolyte stability.

The invention is to be explained with the aid of the following non-limiting examples.

EXAMPLES

Polymer Dispersion 1 (PD1)

10.3 g of a 33 wt. % strength aqueous polystyrene seed (weight-average particle diameter 30 nm) and 327.4 g of deionized water were introduced into a 2 l reactor with an anchor-type stirrer under a nitrogen atmosphere and heated up. When an internal temperature of 75° C. was reached 13 g of a 7 wt. % strength aqueous sodium peroxodisulfate solution were added within 2 minutes and the mixture was stirred at an increasing temperature for 5 minutes. When the reaction temperature of 85° C. was reached the pH was then determined as 3.8 and 30.3 g of a 7 wt. % strength aqueous sodium peroxodisulfate solution were then metered in over 180 minutes at a flow rate which remained constant. Starting at the same time, a monomer emulsion comprising 55.0 g of deionized water
    18.3 g of a 3 wt. % strength aqueous sodium pyrophosphate solution
    1.2 g of a 45 wt. % strength aqueous dodecyl diphenyl ether-disulfonic acid sodium salt solution (Dowfax® 2A1 from Dow Chemical)

9.8 g of a 28 wt. % strength aqueous sodium lauryl polyethaxysulfate solution (Disponil® FES 27 from BASF SE)

34.3 g of a 15 wt. % strength aqueous methacrylamide solution 22.0 g of acrylic acid 147.5 g of styrene and 111.4 g of n-butyl acrylate was metered in during 90 minutes at a flow rate which remained constant. At the end of the feeding in the feed line was flushed with 33.0 g of deionized water, and 27.5 g of a 25 wt. % strength aqueous ammonia solution were then metered in within 15 minutes, during which a pH of 8.7 was established in the aqueous polymerization mixture. A monomer emulsion comprising 55.0 g of deionized water 18.3 g of a 3 wt. % strength aqueous sodium pyrophosphate solution 1.2 g of a 45 wt % strength aqueous dodecyl diphenyl ether-disulfonic acid sodium salt solution 9.8 g of a 28 wt. % strength aqueous sodium lauryl polyethoxysulfate solution 34.3 g of a 15 wt. % strength aqueous methacrylamide solution 5.2 g of isopropenyl-2-oxazoline 142.3 g of styrene and 111.4 g of n-butyl acrylate was metered in over 70 minutes at a flow rate which remained constant. At the end of the feeding in the polymerization mixture was subjected to after-polymerization at the reaction temperature for a further 15 minutes and the temperature was then lowered to 80° C. When 80° C. was reached, starting at the same time 5.5 g of a 10 wt. % strength aqueous tert-butyl hydroperoxide solution and 3.7 g of a 13 wt. % strength aqueous acetone bisulfite solution (1:1 addition product of acetone and sodium hydrogen sulfite) were metered in via separate feeds within 60 minutes at a flow rate which remained constant. After cooling to room temperature (20 to 25° C.) and addition of 33.0 g of deionized water, an aqueous polymer dispersion having a solids content of 42 wt. %, a pH of 9.2 was obtained. The glass transition temperature of the dispersion was determined as 34.4° C.

The determination of the pH before, during and after the polymerization reaction was generally carried out by means of a calibrated InPro® 325X pH electrode of Mettler Toledo GmbH.

The glass transition temperatures were generally determined in accordance with DIN EN ISO 11357-2 (2013 September) via differential scanning calorimetry (DSC) with a heating up rate of 20 K/min by means of a DSC Q2000 of TA Instruments. The midpoint temperatures were used here for the determination The solids contents were generally determined by drying a defined amount of the aqueous polymer dispersion (approx. 0.8 g) to constant weight at a temperature of 130° C. with the aid of the HR73 Moisture Analyzer of Mettler Toledo. Two measurements are carried out in each case and the mean of these two measurements is stated.

Polymer Dispersion 2 (PD2)

9.0 g of a 33 wt. % strength aqueous polystyrene seed (weight-average particle diameter 30 nm) and 361.4 g of deionized water were introduced into a 2 l reactor with an anchor-type stirrer under a nitrogen atmosphere and heated up. When an internal temperature of 75° C. was reached 11.3 g of a 7 wt. % strength aqueous sodium peroxodisulfate solution were added and the mixture was stirred at an increasing temperature for 5 minutes. When the reaction temperature of 95° C. was reached the pH was then determined as 3.9 and 26.4 g of the 7 wt. % strength aqueous sodium peroxodisulfate solution were then metered in over 145 minutes at a flow rate which remained constant. Starting at the same time, a monomer emulsion comprising 55.0 g of deionized water 18.3 g of a 3 wt. % strength aqueous sodium pyrophosphate solution 1.2 g of a 45 wt. % strength aqueous dodecyl diphenyl ether-disulfonic acid sodium salt solution 8.6 g of a 28 wt. % strength aqueous sodium lauryl polyethoxysulfate solution 29.9 g of a 15 wt. % strength aqueous methacrylamide solution 23.5 g of acrylic acid 126.6 g of styrene and 97.2 g of n-butyl acrylate was metered in during 70 minutes at a flow rate which remained constant. At the end of the feeding in the feed line was flushed with 28.8 g of deionized water, and 28.9 g of a 25 wt. % strength aqueous ammonia solution were then metered in within 15 minutes, during which a pH of 8.1 was established in the aqueous polymerization mixture. A monomer emulsion comprising 96.0 g of deionized water 1.1 g of a 45 wt. % strength aqueous dodecyl diphenyl ether-disulfonic acid sodium salt solution 8.6 g of a 28 wt. % strength aqueous sodium lauryl polyethoxysulfate solution 29.9 g of a 15 wt. % strength aqueous methacrylamide solution 4.5 g of isopropenyl-2-oxazoline 122.0 g of styrene and 97.2 g of n-butyl acrylate was then metered in over 70 minutes at a flow rate which remained constant. At the end of the feeding in the polymerization mixture was subjected to after-polymerization at the reaction temperature for a further 15 minutes and the temperature was then lowered to 75° C. When 75° C. was reached, starting at the same time 4.8 g of a 10 wt. % strength aqueous tert-butyl hydroperoxide solution and 3.3 g of a 13 wt. % strength aqueous acetone bisulfite solution were metered in via separate feeds within 60 minutes at a flow rate which remained constant. After cooling to room temperature and addition of 28.8 g of deionized water, an aqueous polymer dispersion having a solids content of 40 wt. %, a pH of 8.8 was obtained. The glass transition temperature of the dispersion was determined as 35.5° C.

Polymer Dispersion 3 (PD3)

9.0 g of a 33 wt. % strength aqueous polystyrene seed (weight-average particle diameter 30 nm) and 361.4 g of deionized water were introduced into a 2 l reactor with an anchor-type stirrer under a nitrogen atmosphere and heated up. When an internal temperature of 75° C. was reached 11.3 g of a 7 wt. % strength aqueous sodium peroxodisulfate solution were added and the mixture was stirred at an increasing temperature for 5 minutes. When the reaction temperature of 95° C. was reached the pH was then determined as 3.7 and 26.4 g of the 7 wt. % strength aqueous sodium peroxodisulfate solution were then metered in over 145 minutes at a flow rate which remained constant. Starting at the same time, a monomer emulsion comprising 96.0 g of deionized water 16.0 g of a 3 wt. % strength aqueous sodium pyrophosphate solution 1.1 g of a 45 wt. % strength aqueous dodecyl diphenyl ether-disulfonic acid sodium salt solution
8.6 g of a 28 wt. % strength aqueous sodium lauryl polyethoxysulfate solution
29.9 g of a 15 wt. % strength aqueous methacrylamide solution
14.4 g of acrylic acid
135.7 g of styrene and
97.2 g of n-butyl acrylate was metered in during 70 minutes at a flow rate which remained constant. At the end of the feeding in the feed line was flushed with 28.8 g of deionized water, and 12.6 g of a 25 wt. % strength aqueous ammonia solution were then metered in within 15 minutes, during which a pH of 8.0 was established in the aqueous polymerization mixture. A monomer emulsion comprising 96.0 g of deionized water
1.1 g of a 45 wt. % strength aqueous dodecyl diphenyl ether-disulfonic add sodium salt solution
8.6 g of a 28 wt. % strength aqueous sodium lauryl polyethoxysulfate solution
29.9 g of a 15 wt. % strength aqueous methacrylamide solution
2.8 g of isopropenyl-2-oxazoline
123.7 g of styrene and
97.2 g of n-butyl acrylate was then metered in over 70 minutes at a flow rate which remained constant. At the end of the feeding in the polymerization mixture was subjected to after-polymerization at the reaction temperature for a further 15 minutes and the temperature was then lowered to 75° C. When 75° C. was reached, starting at the same time 4.8 g of a 10 wt. % strength aqueous tert-butyl hydroperoxide solution and 3.3 g of a 13 wt. % strength aqueous acetone bisulfate solution were metered in via separate feeds within 60 minutes at a flow rate which remained constant. After cooling to room temperature and addition of 28.8 g of deionized water, an aqueous polymer dispersion having a solids content of 40 wt. %, a pH of 9.2 was obtained. The glass transition temperature of the dispersion was determined as 35.5° C.

Polymer Comparative Dispersion 1 (PC1)

The preparation of polymer comparative dispersion 1 was carried out analogously to the preparation of polymer dispersion 1 with the difference that only 257.7 g instead of 327.4 g of deionized water were initially introduced in the polymerization vessel and the monomer emulsion of the first polymerization stage had the following composition:

18.3 g of a 3 wt. % strength aqueous sodium pyrophosphate solution
1.2 g of a 45 wt. % strength aqueous dodecyl diphenyl ether-disulfonic acid sodium salt solution
9.8 g of a 28 wt. % strength aqueous sodium lauryl polyethoxysulfate solution
181.0 g of a 15 wt. % strength aqueous methacrylamide solution
147.5 g of styrene and
111.4 g of n-butyl acrylate An aqueous polymer dispersion having a solids content of 42 wt. %, a pH of 9.2 was obtained. The glass transition temperature of the dispersion was determined as 32.7° C.

Polymer Comparative Dispersion 2 (PC2)

The preparation of polymer comparative dispersion 2 was carried out analogously to the preparation of polymer dispersion 1 with the difference that the monomer emulsion of the first polymerization stage had the following composition:

84.1 g of deionized water
18.3 g of a 3 wt. % strength aqueous sodium pyrophosphate solution
1.2 g of a 45 wt. % strength aqueous dodecyl diphenyl ether-disulfonic acid sodium salt solution
9.8 g of a 28 wt. % strength aqueous sodium lauryl polyethoxysulfate solution
32.3 g of acrylic acid
147.5 g of styrene and
111.4 g of n-butyl acrylate and the monomers stage of the second polymerization stage had the following composition:

84.2 g of deionized water
18.3 g of a 3 wt. % strength aqueous sodium pyrophosphate solution
1.2 g of a 45 wt. % strength aqueous dodecyl diphenyl ether-disulfonic acid sodium salt solution
9.8 g of a 28 wt. % strength aqueous sodium lauryl polyethoxysulfate solution
34.3 g of a 15 wt. % strength aqueous methacrylamide solution
5.2 g of isopropenyl-2-oxazoline
142.3 g of styrene and
111.4 g of n-butyl acrylate An aqueous polymer dispersion having a solids content of 42 wt. %, a pH of 9.2 was obtained. The glass transition temperature of the dispersion was determined as 33.7° C.

Use Tests

For the use tests the abovementioned polymer dispersions PD1 to PD3 and the polymer comparative dispersions PC1 and PC2 were diluted to a solids content of 10.0 wt. % by homogeneous mixing with deionized water at room temperature.

For preparation of the impregnated filter papers a cellulose filter paper having a weight per unit area of 103 g/m$^2$ was used as the untreated paper. For application of the diluted aqueous polymer dispersions (impregnation) the sheets of paper were passed in the longitudinal direction in each case through 10.0 wt. % strength aqueous polymer dispersions over a continuous PES filter belt with a belt running speed of 2.0 m per minute. By subsequent sucking off of the aqueous polymer dispersions the wet application was adjusted to 206 g/m$^2$ (corresponding to 20.6 g/m$^2$ of binder calculated as solid). The impregnated filter papers obtained in this way were dried at 90° C. for 5 minutes in a Mathis oven on a net of plastic as a support at the maximum hot air stream and directly thereafter were crosslinked for one minute at 180° C. in a Mathis oven at the maximum hot air stream and then cooled to room temperature.

Determination of Wet Tear Strength 5 test specimens in dumbbell shape of 115 mm length with a test bar of 6 mm width were cut out of the impregnated sheets of paper in each case longitudinally and transversely to the running direction. The test specimens obtained were then stored in a climatic chamber at 23° C. and 50% relative atmospheric humidity for 24 hours.

For determination of the wet tear strength the test specimens were stored for 2 minutes in a 2 wt. % strength aqueous solution of a sodium alkylsulfonate (Emulgator® E 30 of Leuna Tenside GmbH) and thereafter the excess aqueous solution was dabbed off with a woven cotton fabric. The determination of the wet tear strength was carried out on a tensile tester of Zwick Roell, type Z005. In this test the test specimens were introduced vertically into a clamping device such that the free clamped length was 70 mm. The clamped test specimens were then subsequently drawn apart in the opposite direction at a speed of 50 mm per minute until the test specimens tore. The tear strength is stated in N/mm$^2$.

The higher the tear strength measured when the test specimens tear, the better the corresponding tear strength is to be evaluated. In each case 5 measurements were made in the longitudinal and transverse direction. The values stated in Table 1 in each case represent the mean of these measurements.

Determination of the Bursting Pressure, Wet

The determination of the bursting pressure, wet, was likewise carried out n a test machine from Zwick-Roell, type Z005 with the bursting pressure test module.

In this test a membrane having a thickness of 0.86 mm which bulged by 9.0 mm under a pressure of 30 kPa was used; the delivery of the hydraulic system was 95 ml/min (DIN ISO 2758 and DIN ISO 2759, TestXpert software of Zwick).

Test specimens of 175×230 mm were cut out of the impregnated papers to be tested. The test specimens were then stored in a climatic chamber at 23° C. and 50% relative atmospheric humidity for 24 hours. The test specimens were then likewise stored in a 2 wt. % strength aqueous solution of Emulgator® E 30 for 2 minutes and thereafter the excess aqueous solution was dabbed off pith a woven cotton fabric. The clamp test specimens obtained in this way were then clamped over the elastic, circular membrane such that they were able to bulge with the membrane. The membrane was bulged with a uniform delivery of the hydraulic liquid until the corresponding test specimen burst, the maximum pressure applied for bursting being called the bursting pressure, wet. In each case 5 individual measurements were carried out. The values stated in Table 1 represent the means of these 5 individual measurements. The test results are to be evaluated as better here the higher the corresponding bursting pressure.

Determination of the Electrolyte Stability

The determination of the electrolyte stability was carried out by a procedure in which one drop of the particular (undiluted) polymer dispersion was dropped into a 0.1 wt. % strength aqueous calcium chloride solution at room temperature. The electrolyte stability of the aqueous polymer dispersions was evaluated visually here, coagulation of the polymers being evaluated as negative and a homogeneous distribution of the polymers as positive. The corresponding evaluations obtained are likewise listed in Table 1.

TABLE 1

Wet tear strengths and bursting pressures of the corresponding test specimens and electrolyte resistance of the corresponding polymer dispersions

| Polymer dispersions | PC1 | PC2 | PD1 | PD2 | PD3 |
|---|---|---|---|---|---|
| Wet tear strength longitudinal (N/mm²) | 0.6 | 1.6 | 2.2 | 3.2 | 2.7 |
| transverse (N/mm²) | 0.4 | 1.3 | 1.7 | 2.4 | 2.0 |
| Bursting pressure wet (kPa) | 51 | 102 | 114 | 158 | 141 |
| Electrolyte stability | positive | negative | positive | positive | positive |

It can be clearly seen from the results that the polymer dispersions PD1 to PD3 according to the invention have both improved wet tear strengths and bursting pressures. It also becomes clear from the results that the monomers containing carboxylic acid amide groups have an advantageous effect on the electrolyte stability of the corresponding polymer dispersions.

The invention claimed is:

1. A process for preparing an aqueous polymer dispersion by aqueous emulsion polymerization initiated by free radicals, the process comprising: in an aqueous polymerization medium, performing first free radical polymerization of:
   ≥0.1 and ≤15 wt. % of at least one α,β-monoethylenically unsaturated compound having at least one acid group (monomers A1),
   ≥0 and ≤10 wt. % of at least one monoethylenically unsaturated compound having at least one carboxylic acid amide group (monomers A2), and
   ≥75 and ≤99.9 wt. % of at least one ethylenically unsaturated compound which differs from monomers A1, A2 and B1 (monomers A3),
   wherein the amounts of monomers A1 to A3 total 100 wt. %, to give a polymer A, and
   in the presence of polymer A, performing second free radical polymerization of:
   ≥0.1 and ≤2.0 wt. % of at least one monoethylenically unsaturated compound having at least one oxazoline group (monomers B1),
   ≥0 and ≤10 wt. % of at least one monoethylenically unsaturated compound having at least one carboxylic acid amide group (monomers B2), and
   ≥70 and ≤99.9 wt. % of at least one ethylenically unsaturated compound which differs from monomers A1, B1 and B2 (monomers B3),
   wherein the amounts of monomers B1 to B3 total 100 wt. %, wherein
   a weight ratio of the sum of the total amounts of monomers A1 to A3 (total monomer amount A) to the sum of the total amounts of monomers B1 to B3 (total monomer amount B) is in the range of 1:9 to 9:1,
   a pH of the aqueous polymerization medium during the first free radical polymerization is <5 and thereafter, and
   before starting the second free radical polymerization the pH of the aqueous polymerization medium is increased to >6 by addition of a base,
   wherein the sum of the total amounts of monomers A2 and monomers B2 is ≥0.1 and ≤10 wt. %, based on the sum of total monomer amount A and total monomer amount B (total monomer amount).

2. The process of claim 1,
   wherein the monomers A1 comprises a carboxylic acid group, a phosphoric acid group, or both of the carboxylic acid group and phosphoric acid group.

3. The process of claim 1,
   wherein the monomers A1 are at least one selected from the group consisting of acrylic acid, methacrylic acid, itaconic acid; maleic acid, fumaric acid, crotonic acid, vinylacetic acid, vinyllactic acid, vinylphosphonic acid and (meth)acryloxy (poly)alkoxy phosphate.

4. The process of claim 1,
   wherein the monomers B1 are compounds of formula II:

formula (II)

wherein R is a $C_{2-20}$-alkylene radical having an ethylenically unsaturated group; and $R^1$, $R^2$, $R^3$ and $R^4$ are selected, independently of each other, from the group consisting of hydrogen, halogen, $C_{1-20}$-alkyl, $C_{2-20}$-alkenyl, $C_{6-20}$-aryl, $C_{7-32}$-arylalkyl, $C_{1-20}$-hydroxyalkyl, $C_{1-20}$-aminoalkyl and $C_{1-20}$-haloalkyl.

5. The process of claim 1, wherein the monomers B1 are at least one selected from the group consisting of 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-4,4-dimethyl-2-oxazoline, 2-vinyl-5,5-dimethyl-2-oxazoline, 2-vinyl-4,4,5,5-tetramethyl-2-oxazoline, 2-isopropenyl-2-oxazoline, 2-isopropenyl-4-methyl-2-oxazoline, 2-isopropenyl-5-methyl-2-oxazoline, 2-isopropenyl-4-ethyl-2-oxazoline, 2-isopropenyl-5-ethyl-2-oxazoline, 2-isopropenyl-4,4-dimethyl-2-oxazoline, 2-isopropenyl-5,5-dimethyl-2-oxazoline and 2-isopropenyl-4,4,5,5-tetramethyl-2-oxazoline.

6. The process of claim 1,
wherein the monomers A2, the monomers B2 or both of the monomers A2 and the monomers B2 are at least one selected from the group consisting of acrylamide and methacrylamide.

7. The process claim 1,
wherein the total amount of monomers A1 is $\geq 4.0$ and $\leq 12$ wt. %, based on the total monomer amount A.

8. The process claim 1,
wherein the total amount of monomers B1 is $\geq 0.5$ and $\leq 5.0$ wt. %, based on the total monomer amount B.

9. The process claim 1,
wherein the sum of the total amounts of monomers A2 and monomers B2 is $\geq 1.0$ and $\leq 3.0$ wt %, based on the total monomer amount.

10. The process of claim 1,
wherein the weight ratio of the total monomer amount A to the total monomer amount B is in the range of 1:2 to 2:1.

11. The process of claim 1,
wherein the total amount of monomers A1 in the first free radical polymerization and the total amount of monomers B1 in the second free radical polymerization is chosen such that the molar ratio of acid groups to oxazoline groups is $\geq 5$.

12. The process of claim 1,
wherein the base employed for increasing the pH before the second free radical polymerization has a boiling point of $\leq 20°$ C. under a pressure of 1.013 bar (absolute).

13. The process of claim 1,
wherein nature and amount of monomers A1 to A3 and/or monomers B1 to B3 are chosen such that a polymer built up solely from these monomers has a glass transition temperature in the range of $\geq -15$ and $\leq 100°$ C.

14. An aqueous polymer dispersion obtained by the process of claim 1.

15. A binder, comprising:
the aqueous polymer dispersion of claim 14.

16. A method for improving a tear strength of a fiber nonwoven under action of heat, the method comprising:
contacting the fiber nonwoven with the aqueous polymer dispersion of claim 14.

17. A method for increasing a bursting pressure of a filter paper under wet conditions, the method comprising:
contacting the filter paper with the aqueous polymer dispersion of claim 14.

* * * * *